(12) United States Patent
Yamamoto et al.

(10) Patent No.: US 10,239,492 B2
(45) Date of Patent: Mar. 26, 2019

(54) WIRELESS AUTHENTICATION DEVICE FOR SADDLE-TYPE VEHICLE

(71) Applicant: KAWASAKI JUKOGYO KABUSHIKI KAISHA, Kobe-Shi, Hyogo (JP)

(72) Inventors: Tomo Yamamoto, Akashi (JP); Taro Iwamoto, Kakogawa (JP)

(73) Assignee: Kawasaki Jukogyo Kabushiki Kaisha, Kobe-Shi (JP)

( * ) Notice: Subject to any disclaimer, the term of this patent is extended or adjusted under 35 U.S.C. 154(b) by 0 days.

(21) Appl. No.: 15/825,542

(22) Filed: Nov. 29, 2017

(65) Prior Publication Data

US 2018/0170312 A1 Jun. 21, 2018

(30) Foreign Application Priority Data

Dec. 21, 2016 (JP) .................. 2016-247800

(51) Int. Cl.
| | |
|---|---|
| *B60R 25/24* | (2013.01) |
| *B62H 5/00* | (2006.01) |
| *B60R 25/021* | (2013.01) |
| *B62M 7/02* | (2006.01) |
| *B62H 5/08* | (2006.01) |

(52) U.S. Cl.
CPC .......... *B60R 25/241* (2013.01); *B60R 25/021* (2013.01); *B60R 25/246* (2013.01); *B62H 5/00* (2013.01); *B62H 5/08* (2013.01); *B62M 7/02* (2013.01); *B60R 2325/306* (2013.01)

(58) Field of Classification Search
CPC ... B60R 25/04; B60R 25/24; B60R 2325/306; G07C 9/00007; G07C 9/00309; G07C 2009/00769
See application file for complete search history.

(56) References Cited

U.S. PATENT DOCUMENTS

| | | | |
|---|---|---|---|
| 6,861,947 B2 * | 3/2005 | Albert ................... | B60R 25/042 123/179.2 |
| 7,498,928 B2 * | 3/2009 | Konno .................... | B60R 25/24 340/426.15 |

(Continued)

FOREIGN PATENT DOCUMENTS

JP 4481207 B2 6/2010

*Primary Examiner* — Brian E Miller
(74) *Attorney, Agent, or Firm* — Burr & Brown, PLLC

(57) ABSTRACT

A wireless authentication device for a saddle-type vehicle performs authentication through wireless communication with a mobile terminal carried by a user. The wireless authentication device for a saddle-type vehicle includes a first operating input device, a light-emitting and notification part, and a controller. The first operating input device receives an operation of switching to a state in which a power engine is capable of being started. The light-emitting and notification part is provided in the first operating input device or in a portion surrounding the first operating input device, and performs a light-emitting and notification operation in which light is emitted to notify a user that authentication has succeeded. The controller determines whether authentication has succeeded through wireless communication with a mobile terminal, and if the authentication has been determined to have succeeded, causes the light-emitting and notification part to perform the light-emitting and notification operation.

11 Claims, 6 Drawing Sheets

(56) References Cited

U.S. PATENT DOCUMENTS

| | | | | |
|---|---|---|---|---|
| 7,656,278 B2* | 2/2010 | Onishi | ................... | B60R 25/04 |
| | | | | 340/426.12 |
| 8,102,247 B2* | 1/2012 | Arakawa | ................. | B60R 25/33 |
| | | | | 340/426.1 |
| 8,237,543 B2* | 8/2012 | Umeda | ................... | B60R 25/24 |
| | | | | 340/5.61 |
| 9,524,596 B2* | 12/2016 | Kataoka | .............. | G07C 9/00111 |
| 2002/0190843 A1* | 12/2002 | Konno | .................... | B62H 5/20 |
| | | | | 340/5.64 |
| 2003/0024754 A1* | 2/2003 | Konno | ................... | B60R 25/02 |
| | | | | 180/287 |
| 2004/0063477 A1* | 4/2004 | Konno | ................... | B60R 25/04 |
| | | | | 455/575.9 |
| 2004/0090307 A1* | 5/2004 | Konno | ................... | B60R 25/04 |
| | | | | 340/5.62 |
| 2005/0242929 A1* | 11/2005 | Onishi | ................... | B60R 25/04 |
| | | | | 340/426.17 |
| 2007/0214849 A1* | 9/2007 | Yoshitake | ............... | B60R 25/04 |
| | | | | 70/278.3 |
| 2016/0063843 A1* | 3/2016 | Karmel | ............... | G08B 21/182 |
| | | | | 340/686.6 |

* cited by examiner

F I G . 1
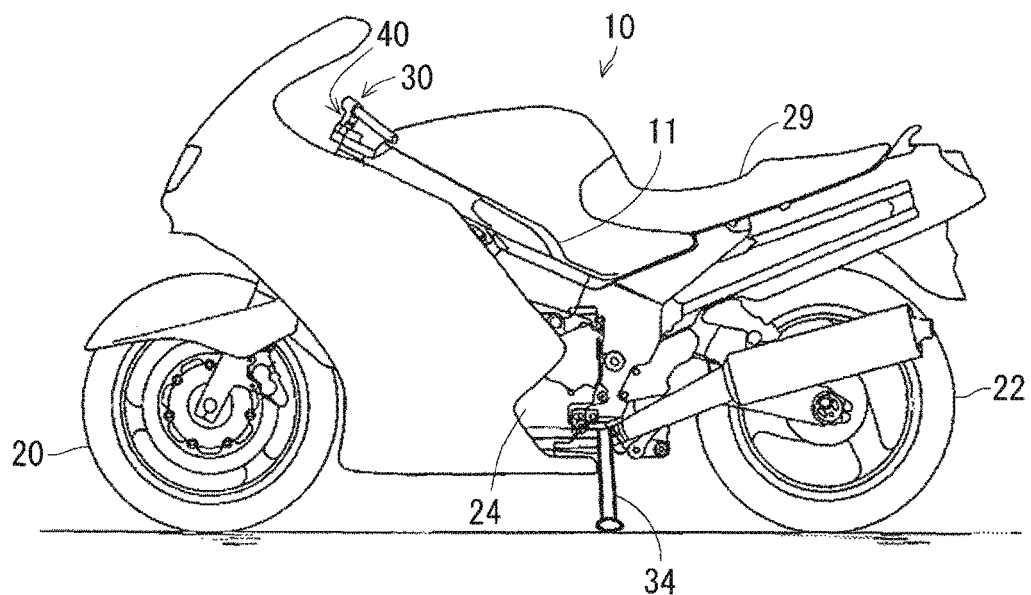
F I G . 2
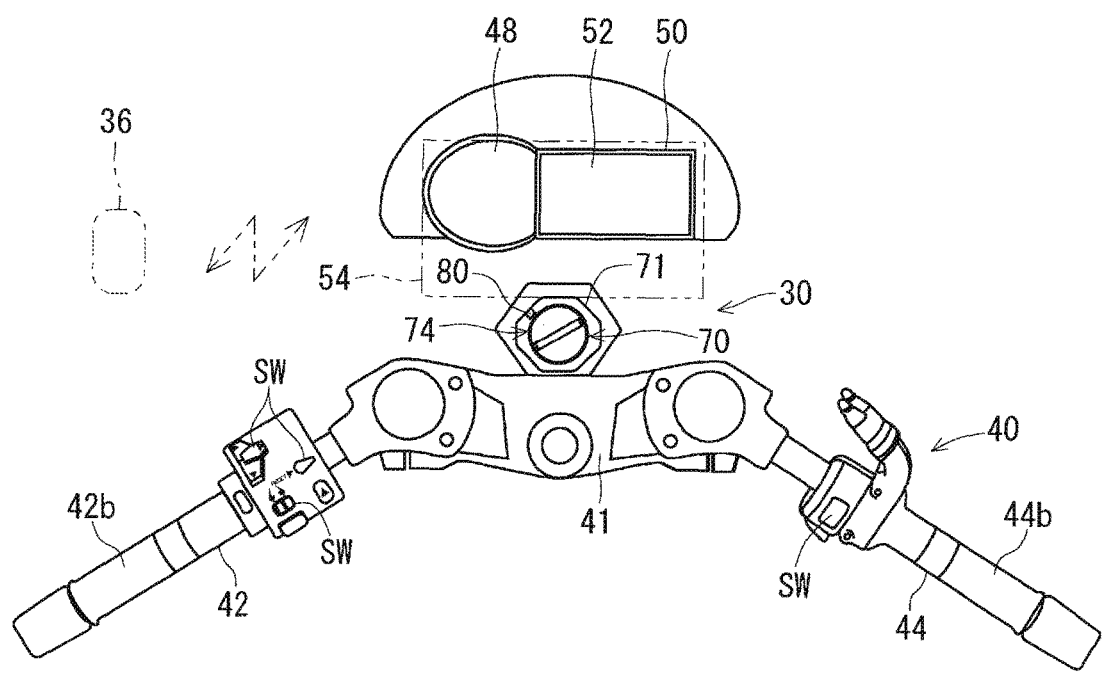

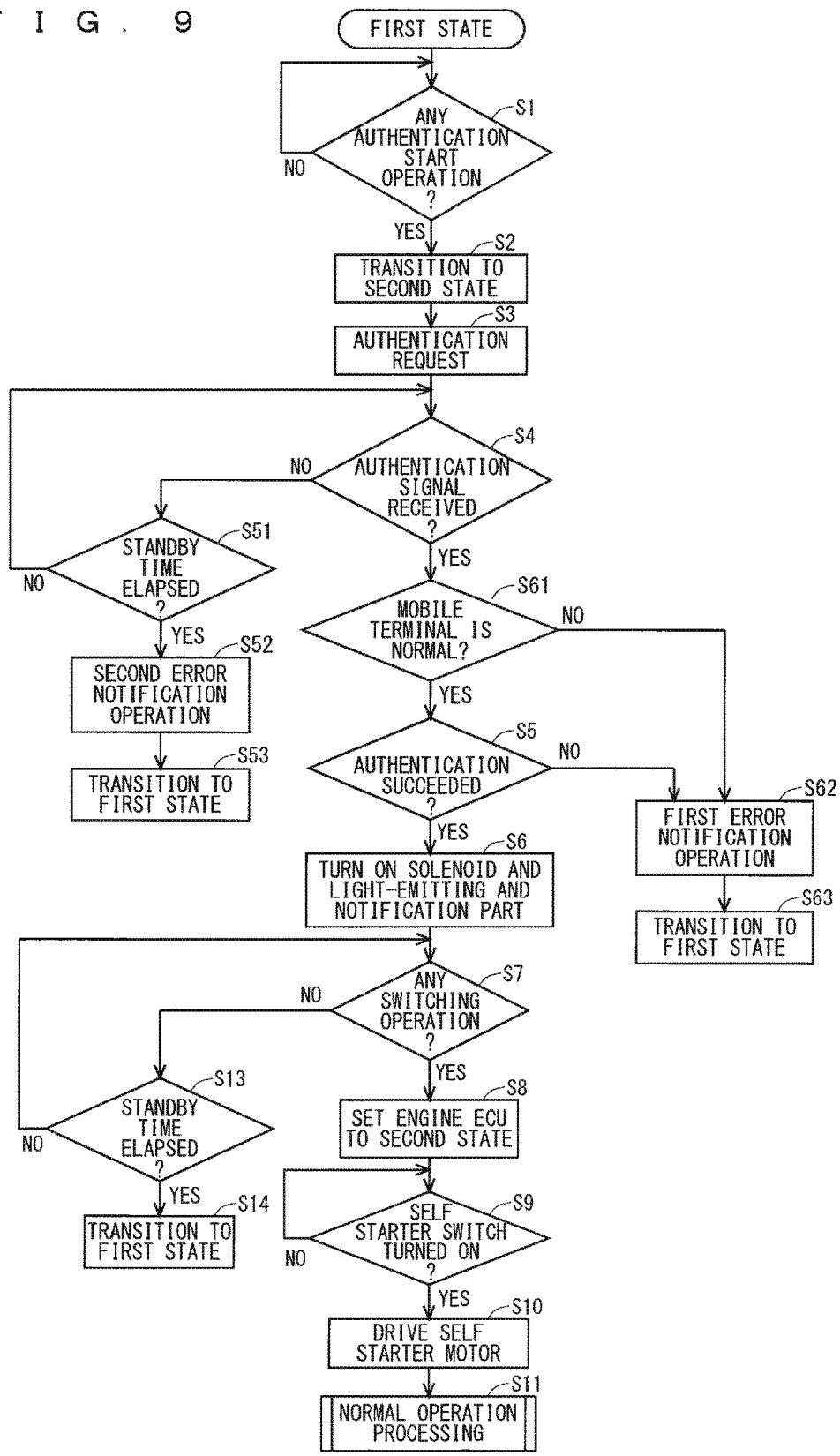

WIRELESS AUTHENTICATION DEVICE FOR SADDLE-TYPE VEHICLE

BACKGROUND OF THE INVENTION

Field of the Invention

The present invention relates to a wireless authentication device for saddle-type vehicles, and in particular to a technique for notifying a user that authentication has succeeded.

Description of the Background Art

Japanese Patent No. 4481207 discloses a configuration in which a hand-operated switch is placed between a battery and a controller that performs authentication via a portable transmitter, and electricity is supplied from the battery to the controller when the hand-operated switch is operated to the closed position. It is also disclosed that when the controller has determined that authentication has succeeded, a flasher flashes on and off as an answerback.

The driver of a saddle-type vehicle typically operates a hand-operated switch while checking the position of the hand-operated switch.

SUMMARY OF THE INVENTION

It is an object of the present invention to enable a driver to more reliably grasp whether authentication has succeeded.

A wireless authentication device for a saddle-type vehicle according to an aspect of the present invention performs authentication through wireless communication with a mobile terminal carried by a user. This wireless authentication device for a saddle-type vehicle includes a first operating input device, a light-emitting and notification part, and a controller. The first operating input device receives an operation of switching to a state in which a power engine is capable of being started. The light-emitting and notification part is provided in the first operating input device or in a portion surrounding the first operating input device and performs a light-emitting and notification operation in which light is emitted to notify a user that authentication has succeeded. The controller determines whether authentication has succeeded through wireless communication with a mobile terminal, and if the authentication has been determined to have succeeded, causes the light-emitting and notification part to perform the light-emitting and notification operation.

According to this wireless authentication device for a saddle-type vehicle, when the authentication has been determined to have succeeded, the light-emitting and notification part, which is provided in the first operating input device or in the portion surrounding the first operating input device, performs the light-emitting and notification operation. Thus, when operating the first operating input device, the driver is able to more reliably determine whether authentication has succeeded.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a side view of an overall configuration of a motorcycle;

FIG. 2 is a descriptive diagram illustrating a configuration around a handle device and a meter unit of the motorcycle;

FIG. 9 is a flowchart illustrating authentication processing performed by an authentication ECU according to a second variation.

DESCRIPTION OF THE PREFERRED EMBODIMENTS

Figure 3:
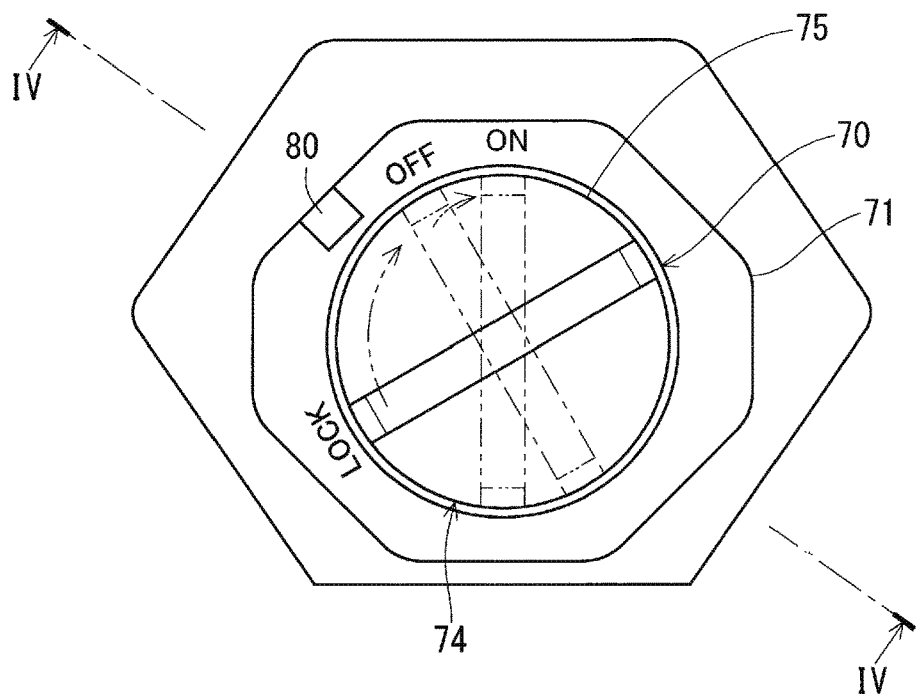
FIG. 3 is a schematic plan view of a start switch unit.

A wireless authentication device for saddle-type vehicles according to an embodiment will now be described hereinafter. The following embodiment describes an example in which the saddle-type vehicle is a motorcycle. The wireless authentication device according to the present invention is also applicable to other saddle-type vehicles different from motorcycles, such as all-terrain vehicles (ATVs) and personal watercrafts.

For purposes of description, an overall configuration of the motorcycle will be described. FIG. 1 is a side view illustrating an overall configuration of a motorcycle 10. In the following description, up-and-down, back-and-forth, and right-and-left directions as referred to are each defined as follows. First, a side of the motorcycle 10 on which a front wheel 20 and a rear wheel 22 contact the road surface is referred to as a downward direction, and the opposite side of the motorcycle 10 is referred to as an upward direction. A direction in which the motorcycle 10 travels is referred to as a forward direction, and the opposite direction is referred to as a backward direction. With a user as a driver on the motorcycle, the right and left sides with respect to the user are referred to as the right and left sides of the motorcycle 10.

The motorcycle 10 is configured such that the front wheel 20 is rotationally mounted to the front side of a body frame 11, and the rear wheel 22 is rotationally mounted to the back side of the body frame 11. The body frame 11 is equipped with an engine 24, and the rear wheel 22 is rotationally driven by the engine 24. A handle device 40 is mounted to the front side of the body frame 11 and turned by the user to change the orientation of the front wheel 20 and thereby change the travel direction of the motorcycle 10. On the upper side of the body frame 11, a seat 29 is mounted on which the user as a driver sits.

The motorcycle 10 according to the present embodiment is also equipped with a side stand 34 that prevents the motorcycle 10 from falling to the ground while at a standstill. The side stand 34 is supported on the left side of the body frame 11 either directly or via a bracket so as to be capable of changing its position. The side stand 34 is supported so as to be capable of changing its position between a supporting position and a retracted position, the supporting position being a position at which the side stand 34 extends diagonally downward and outward in the direction of the vehicle width from the support site, and the retracted position being a position at which the side stand 34 extends along the support site toward the back of the motorcycle. The motorcycle 10 travels while the side stand 34 is at the retracted position. For example, when the motorcycle 10 is parked, the motorcycle 10 is supported by the side stand 34 so as not to fall to the ground, with the side stand 34 being turned to the supporting position, the motorcycle 10 being leaned to the left, and the end of the side stand 34 being in contact with the ground. Normally, a user standing on the left side of the motorcycle 10 is able to change the position of the side stand 34 from the supporting position to the retracted position, and vice versa. The side stand may be provided on the right side of the vehicle. Alternatively, a center stand may be used instead of the side stand 34.

FIG. 2 is a descriptive diagram illustrating a configuration around the handle device 40 of the motorcycle 10.

The handle device 40 includes a left handlebar 42 and a right handlebar 44. The handle device 40 is supported via a bracket 41 or other means and provided so as to be capable of being turned along with a steering shaft that is rotatably supported on a head pipe mounted to the front side of the body frame 11.

The left handlebar 42 is equipped with a handle grip 42b. The user drives the motorcycle while gripping the handle grip 42b. The left handlebar 42 is also provided with switches SW that are disposed inward of the handle grip 42b in the direction of the vehicle width and that enable the user to input various instructions.

The right handlebar 44 is equipped with a handle grip 44b. The user drives the motorcycle while gripping the handle grip 44b. The right handlebar 44 is also provided with switches SW that are disposed inward of the handle grip 44b in the direction of the vehicle width and that enable the user to input various instructions. In particular, the switches SW on the right handlebar 44 include a self starter switch SW1 for starting the engine. The self starter switch SW1 is a switch for rotating a self starter motor to start the engine. The user presses the self starter switch SW1 with only the timing of rotation of the self starter motor, and does not press the self starter switch SW1 after start-up of the engine. Here, the self starter switch SW1 is provided as a switch that is separate from an engine stop switch (also called a "kill switch"). As another example, a switch that serves as both the self starter switch and the engine stop switch may be provided.

A meter unit 50 is provided in a position ahead of the handle device 40. The meter unit 50 includes a tachometer 48 and a display 52. The tachometer 48 indicates the number of revolutions of the engine 24, and the display 52 displays various types of information such as vehicle speed and residual fuel, i.e., provides various types of information to the user. The meter unit 50 may be provided so as to be capable of being turned along with the handle device 40 when the handle device 40 is operated by the user, or may be provided so as to maintain a fixed positional relationship with the body frame 11 and not to turn even if the handle device 40 is operated by the user. In the case where the meter unit 50 turns along with the handle device 40, the meter unit 50 is mounted to the vehicle via a bracket mounted to an upper bracket, an under bracket, or a front fork. The upper bracket and the under bracket are supported by the steering shaft, which is rotatably supported on the head pipe mounted to the front side of the body frame 11, and the front fork is supported by the upper bracket and the under bracket. In the case where the meter unit 50 does not turn along with handle device 40 and maintains a fixed positional relationship with the body frame 11, the meter unit 50 is mounted to the body frame 11 or to the vehicle via one or a plurality of stays mounted to the body frame 11.

A start switch unit 70 is provided in a position between the left handlebar 42 and the right handlebar 44 and behind the meter unit 50. The start switch unit 70 may be provided at other places such as in the meter unit. The start switch unit 70 receives operations from the user when starting the engine 24.

The motorcycle 10 includes an authentication electronic control unit (ECU) 54 that receives operations from the user via the start switch unit 70 and performs processing such as authentication through wireless communication with a mobile terminal 36 carried by the user. While the authentication ECU 54 illustrated in FIG. 2 is located below the meter unit 50, the authentication ECU 54 may be located at any other position.

A wireless authentication device 30 is incorporated into a vehicle such as the motorcycle described above and performs authentication through wireless communication with the mobile terminal 36 carried by the user. The wireless authentication device 30 includes a first operating input device, a light-emitting and notification part, and a control unit. The first operating input device receives an operation of switching to a state in which the engine 24, which is one example of a power engine, is capable of being started. The light-emitting and notification part performs a light-emitting and notification operation in which light is emitted to notify the user that authentication has succeeded. The control unit determines whether the authentication has succeeded through wireless communication with the mobile terminal, and if the authentication has been determined to have succeeded, causes the light-emitting and notification part to perform the light-emitting and notification operation.

One example of the first operating input device is a combination of an operation part 74 and a rotation detector 76 of the start switch unit 70, which will be described later, one example of the light-emitting and notification part is a light-emitting and notification part 80, and one example of the control unit is the authentication ECU 54 described above. Each constituent element will be described in more detail hereinafter.

Figure 4:
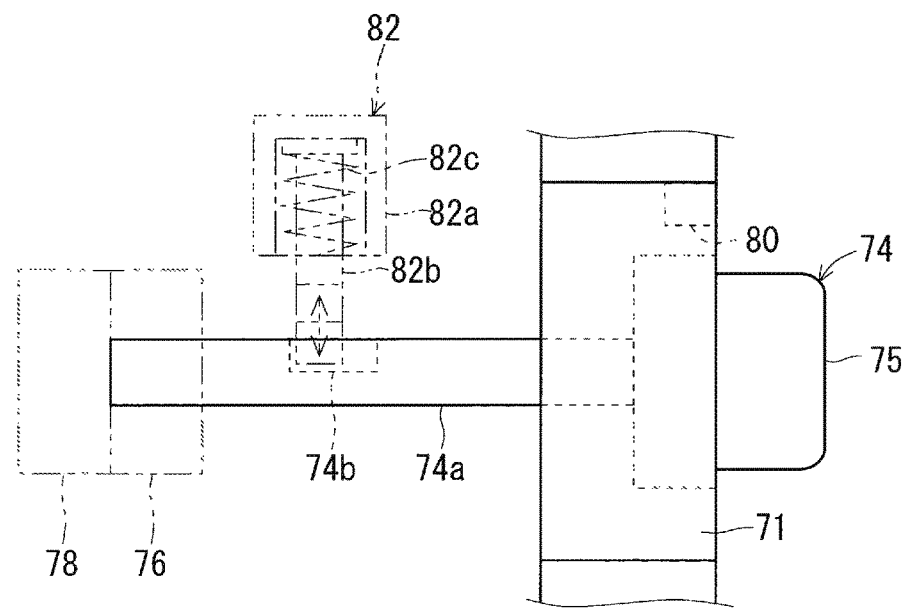
FIG. 4 is a descriptive diagram illustrating an internal configuration of the start switch unit taken along line IV-IV in FIG. 3.

FIG. 3 is a schematic plan view of the start switch unit 70, and FIG. 4 is a descriptive diagram illustrating an internal configuration of the start switch unit 70 taken along line IV-IV in FIG. 3.

The start switch unit 70 includes the operation part 74, the rotation detector 76, and a push detector 78.

The operation part 74 is configured to have a knob 75 at one end of a shaft part 74a. An outward portion of the knob 75 has a long narrow projection that makes it easier for the user to hold the knob between fingers and rotate the knob. This operation part 74 is supported so as to be rotatable relative to a switch base 71 and to be capable of being pushed and moved in a direction parallel to the axis of this rotation, while the knob 75 is exposed to the outside. The switch base 71 is supported in a fixed position relative to the upper bracket. As another alternative, the switch base 71 may be supported in a fixed position relative to other members such as an exterior member or the body frame 11.

An outward portion of the switch base 71 has characters such as "LOCK," "OFF," and "ON" written thereon as marks that indicate the rotational position of the operation part 74.

The rotation detector 76 is configured by a rotary switch or the like. When the user rotates the operation part 74 by operating and rotating the knob 75, the rotation detector 76 detects this rotation and outputs an operation signal that depends on the detection result.

In the present example, the user is able to rotate the operation part 74 from the rotational position indicating "LOCK" described above through the rotation position indicating "OFF" to the rotational position indicating "ON" and vice versa by holding the knob 75 between fingers and operating the knob 75. The rotation detector 76 is configured to be capable of outputting a LOCK signal, an OFF signal, or an ON signal that depends on the rotational position of the knob 75. In the present example, when the knob 75 is rotated to the rotational position indicating "ON," the rotation detector 76 outputs an ON signal to the authentication ECU 54, the ON signal being a signal that instructs the authentication ECU 54 to enable the startup of the engine, and the authentication ECU 54 enables the startup of the engine 24, which is one example of a power engine. That is, assuming that the above-described state in which the knob 75 is at the rotational position indicating "LOCK" is defined as a first position and a state in which the knob 75 is at the rotational position indicating ON" is defined as a second position, the knob 75 is configured to be operated and displaced from the first position to the second position so as to be capable of receiving an operation of switching to a state in which the engine 24, which is one example of a power engine, is capable of being started. When the vehicle has been switched to the state in which the engine 24 is capable of being started, the user becomes able to press the self starter switch SW1 described above to rotate the self starter motor and thereby start the engine 24. With the engine 24 started, the knob 75 is maintained at the second position.

When the knob 75 is rotated to the position indicating "OFF" during rotation from the first position to the second position, the power to the vehicle is turned on and handles or other parts are unlocked, while the engine 24 is not capable of being started. When the knob 75 is further rotated from this state, the vehicle is switched to the state in which the engine 24 is capable of being started as described above, while the power to the vehicle remains on and handles or other parts remain unlocked.

The push detector 78 is configured by a switch that is capable of detecting the push and displacement of the operation part 74. When the user has pushed the knob 75 and displaced the operation part 74 in the direction of the push, the push detector 78 detects this displacement in the direction of the push and outputs an operation signal that depends on the detection result. In the present example, when the user has operated and pushed the operation part 74, the push detector 78 issues an authentication start signal to the authentication ECU 54. Thus, the push detector 78 is one example of a second operating input device that is capable of receiving an authentication start operation and, in particular, one example of a displacement operating input device that receives an operation of displacing the operation part 74, which is part of an example of the first operating input device.

The start switch unit 70 described above includes the light-emitting and notification part 80 and a solenoid actuator 82.

The light-emitting and notification part 80 is configured by a device such as a light emitting diode, an organic electroluminescent (EL) light-emitting device, or an incandescent lamp. In terms of low power consumption, the light-emitting and notification part 80 is preferably a device such as a light emitting diode or an organic EL light-emitting device.

The light-emitting and notification part 80 is provided in the switch base 71, which is a portion surrounding the knob 75 described above, so as to enable the user to visually identify the light emitting state of the light-emitting and notification part 80 from the front side of the switch base 71. In the present example, the light-emitting and notification part 80 is disposed fitting in the front portion of the switch base 71. More specifically, the light-emitting and notification part 80 is provided on the left half side around the knob 75, and more specifically, in a position on the upper left side around the knob 75 (i.e., 10 o'clock position on the analog clock face). Since the side stand 34 is provided on the left side of the vehicle in the present embodiment, the light-emitting and notification part 80 is provided on the same side of the operation part 74 as the side stand 34. This light-emitting and notification part 80 emits light when authentication has been determined to have succeeded as will be described later, so as to notify the user that the authentication has succeeded. Alternatively, the light-emitting and notification part 80 may be an outer plate that includes the start switch unit 70, and may be provided in a portion surrounding the operation part 74.

The solenoid actuator 82 is configured to be capable of imposing or removing restrictions on the rotation of the operation part 74 relative to the switch base 71. The solenoid actuator 82 may adopt a configuration that includes, for example, a solenoid 82a, a motion restriction part 82b, and a biasing part 82c such as a coil spring. The motion restriction part 82b is configured by a magnetic material such as iron or other materials and disposed so as to be movable toward and away from the shaft part 74a. When moving toward the shaft part 74a, the motion restriction part 82b fits in a restriction recess 74b formed in the shaft part 74a to restrict the rotation of the operation part 74, whereas when moving away from the shaft part 74a, the motion restriction part 82b allows the operation part 74 to rotate. The biasing part 82c always biases the motion restriction part 82b in the direction toward the shaft part 74a. The solenoid 82a is driven and controlled by the authentication ECU 54 to switch between excited and de-excited states. In the excited state, the solenoid 82a attracts the motion restriction part 82b in the direction of retraction. In the de-excited state of the solenoid 82a, the motion restriction part 82b is positioned by the biasing force of the biasing part 82c to restrict the rotation of the operation part 74, thus making it difficult for the user to rotate the knob 75 even if the user tries to by holding the knob 75 between fingers. In the excited state of the solenoid 82a, the magnetic force of the solenoid 82a acts against the biasing force of the biasing part 82c and draws and moves the motion restriction part 82b in the direction of retraction, thus enabling the user to easily rotate the operation part 74 by holding the knob 75 between fingers.

The solenoid actuator 82 is preferably configured such that, even when the motion restriction part 82b restricts the rotation of the operation part 74, a torque limiter is built into the switch base 71 and, when the knob 75 is operated by a force greater than a predetermined level, causes the operation part 74 to turn free without being rotated equally relative to the switch base 71 so as to prevent the operation part 74 from becoming damaged.

Using the solenoid actuator 82 as described above as a switching configuration for imposing or removing regulations on the rotation of the operation part 74 is not an absolute necessity, and it is also possible to use other configurations different from the configuration described above, such as a configuration for changing the posture or position of a rotation regulation piece by driving an electric motor or other means.

Figure 5:
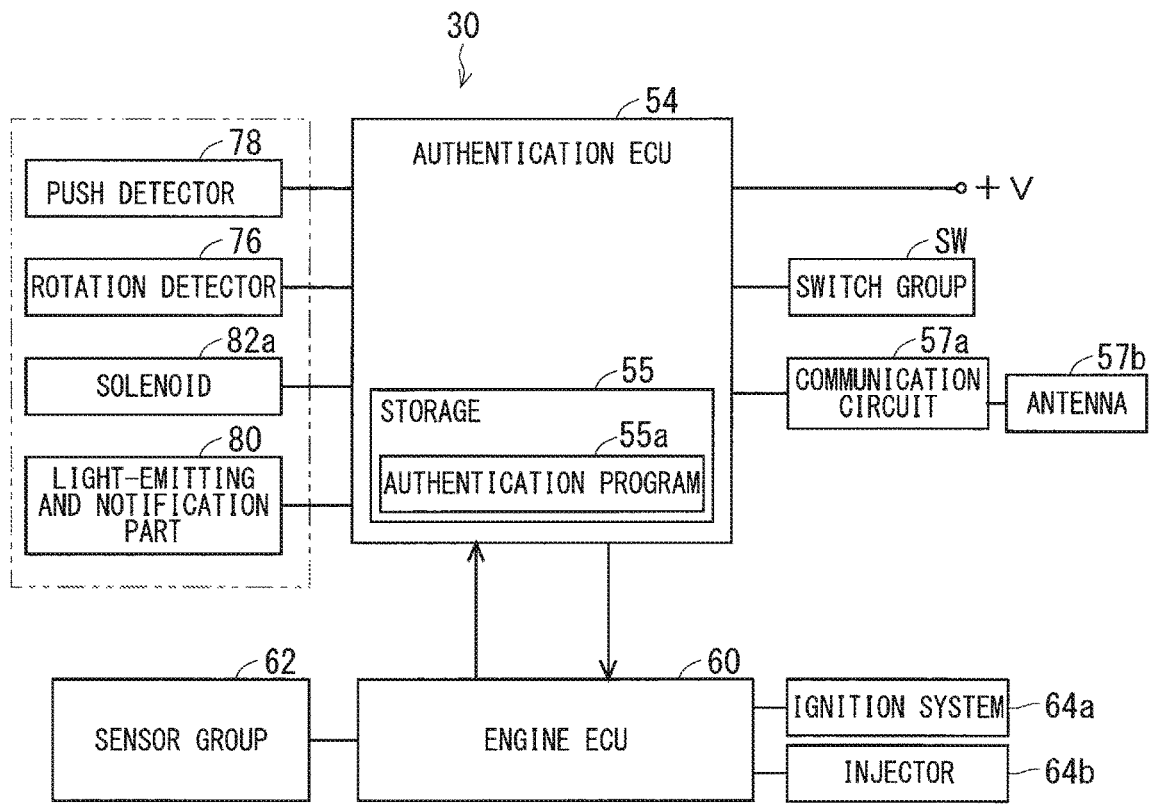
FIG. 5 is a block diagram illustrating an electrical configuration of the motorcycle.

FIG. 5 is a block diagram illustrating an electrical configuration of the motorcycle 10. The motorcycle 10 includes the authentication ECU 54 and an engine ECU 60.

The authentication ECU 54 is configured by a typical microcomputer that includes, for example, a CPU (processor), a ROM, and a RAM and performs all arithmetic operations via software programs stored in advance. The authentication ECU 54 stores an authentication program 55a in a storage 55 that is configured by a rewritable flash memory or the like. This authentication ECU 54 performs authentication processing, which will be described later, in accordance with a processing procedure described in the authentication program 55a.

In the present embodiment, the authentication ECU 54 functions as an authentication control unit that performs authentication through wireless communication with the mobile terminal 36 and performs various types of processing to start the engine 24, and also has a function of receiving various inputs from the group of switches SW including the self starter switch SW1. In the present example, the authentication ECU 54 has other functions such as controlling the display content of the display 52, but this is not an absolute necessity.

Like the authentication ECU 54, the engine ECU 60 is also configured by a typical microcomputer and performs various types of control through bi-directional communication such as CAN communication with the authentication ECU 54 described above.

The function of the authentication ECU 54 performing authentication through wireless communication with the mobile terminal 36 and executing various types of processing to start the engine 24 may be implemented by other ECUs different from the ECU that performs functions such as receiving various inputs from the group of switches SW and controlling the display content of the display 52, or may be implemented as one of the functions of the engine ECU 60 described above.

The authentication ECU 54 is connected to the rotation detector 76, the push detector 78, the solenoid actuator 82, and the light-emitting and notification part 80, which are constituent elements of the start switch unit 70. When the user has rotated the operation part 74 by holding the knob 75 between fingers, the rotation detector 76 inputs a signal indicating the rotational position of the operation part 74, to the authentication ECU 54. When the user has pushed the knob 75 and displaced the operation part 74 in the direction of the push, the push detector 78 inputs a signal (authentication start signal) indicating the push of the operation part 74 to the authentication ECU 54. The solenoid actuator 82 and the light-emitting and notification part 80 are driven and controlled by the authentication ECU 54 to operate. The light-emitting and notification part 80 may emit light when electricity is directly supplied from a high-current port or the like of the authentication ECU 54, or may emit light when a switching element included in a power supply circuit for supplying power to the light-emitting and notification part 80 is turned on under the control of the authentication ECU 54. The light-emitting and notification part 80 is capable of emitting light under the operational control of the authentication ECU 54, irrespective of the operating state of the engine ECU 60.

The authentication ECU 54 is also connected to a power source and the group of switches SW including the self starter switch SW1 and is also connected via a wireless communication circuit 57a to an antenna 57b. The authentication ECU 54 is operated by power supplied from the power source, performs operations such as receiving various instructions from the group of switches SW, and performs wireless communication with the mobile terminal 36 via the wireless communication circuit 57a and the antenna 57b.

The engine ECU 60 is connected to, for example, an ignition system 64a and an injector 64b that are mounted to the motorcycle 10, and performs control relating primarily to the engine 24.

The authentication ECU 54 and the engine ECU 60 operate in cooperation with each other and performs processing such as control of the engine 24 on the basis of various instructions from the group of switches SW and various outputs from a sensor group 62.

Figure 6:
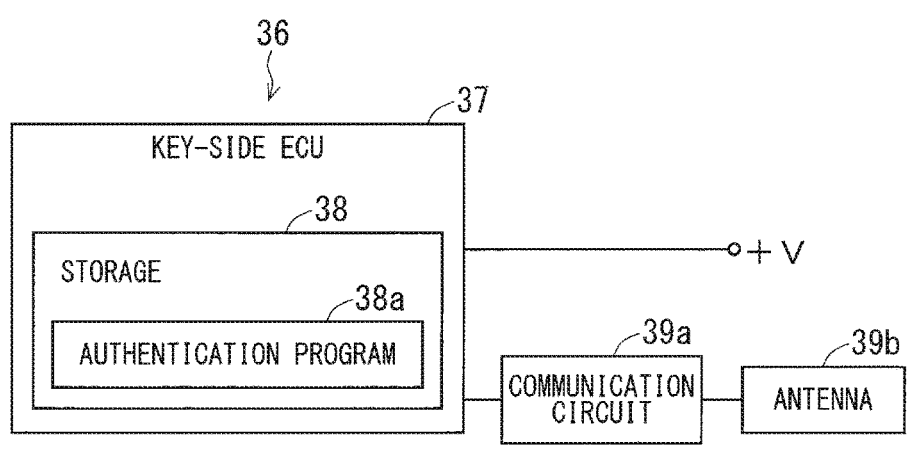
FIG. 6 is a block diagram illustrating an electrical configuration of a mobile terminal.

FIG. 6 is a block diagram illustrating an electrical configuration of the mobile terminal 36. The mobile terminal 36 includes a key-side ECU 37, a wireless communication circuit 39a, and an antenna 39b.

Like the authentication ECU 54, the key-side ECU 37 is configured by a typical microcomputer and operates with power supplied from a button battery or other batteries built into the mobile terminal 36. The key-side ECU 37 includes a storage 38 that is configured by a rewritable flash memory or the like. The storage 38 stores a key-side authentication program 38a. The key-side ECU 37 performs processing relating to authentication in accordance with a procedure described in the key-side authentication program 38a through wireless communication with the authentication ECU 54 via the wireless communication circuit 39a and the antenna 39b.

The authentication ECU 54 described above has a function of performing authentication through wireless communication with the mobile terminal 36 and performing processing described below.

First, the authentication ECU 54 determines whether authentication has succeeded through wireless communication with the mobile terminal 36, and if the authentication has been determined to have succeeded, causes the light-emitting and notification part 80 to perform the light-emitting and notification operation.

In the present example, when an authentication start operation has been received via the second operating input device, the authentication ECU 54 determines whether authentication has succeeded through wireless communication with the mobile terminal 36. Since the push detector 78 is provided as the second operating input device in the present example, the authentication ECU 54 receives an authentication start operation when the user has pushed the knob 75 of the operation part 74.

When having determined that the authentication has succeeded, the authentication ECU 54 causes the light-emitting and notification part 80 to perform the light-emitting and notification operation. Accordingly, the user sees the light emission from the light-emitting and notification part 80 and is able to recognize that the authentication has succeeded.

When having determined that the authentication has succeeded, the authentication ECU 54 also turns on the solenoid 82a and switches the solenoid 82a to the excited state. This causes the motion restriction part 82b to move in the direction of retraction and thereby enables the user to rotate the operation part 74. In this state, the user is able to rotate and displace the operation part 74 from the first position to the second position by holding the knob 75 between fingers. When the operation part 74 has been displaced from the first position to the second position, the rotation detector 76 outputs a signal that depends on the displacement of the operation part 74 to the authentication ECU 54. Upon receipt of this signal, the authentication ECU 54 issues a signal that enables the startup of the engine 24, to the engine ECU 60. When the user has operated the self starter switch SW1 in this state, the engine 24 is started under the control of the engine ECU 60.

One example of a flowchart of the above-described processing performed by the authentication ECU 54 and the key-side ECU will be described with reference to FIG. 7. The flowchart described herein is merely one example and does not intend to describe that the above-described processing performed by the authentication ECU 54 is limited to the processing described below.

In the initial state, the authentication ECU 54 is in its first state. The first state is a state in which less power is consumed than in a second state that will be described later and in which the authentication ECU 54 is capable of transitioning to the second state in which the authentication ECU 54 is capable of executing various types of arithmetic processing upon receipt of the authentication start signal from the push detector 78. Similarly, the key-side ECU 37 is in its first state in the initial state. The first state is a state in which less power is consumed than in a second state that will be described later and in which the key-side ECU 37 is capable of transitioning to the second state upon receiving input of a radio signal via the antenna 39b and the wireless communication circuit 39a. The first states may be a sleep state, and the second states may be a wake-up state in which the CPU is capable of executing various types of arithmetic processing.

When the user has pushed the knob 75 in this state, the push detector 78 outputs an authentication start signal to the authentication ECU 54, the authentication ECU 54 has determined the presence of the authentication start operation in step S1, and the procedure proceeds to step S2.

In step S2, the authentication ECU 54 transitions to the second state.

Next, in step S3, the authentication ECU 54 transmits an authentication request signal wirelessly via the wireless communication circuit 57a and the antenna 57b, and the procedure proceeds to step S4.

When the key-side ECU 37 has received the radio signal via the antenna 39b and the wireless communication circuit 39a in step S21, the procedure proceeds to step S22 in which the key-side ECU 37 transitions to the second state.

Next, in step S23, the key-side ECU 37 transmits a radio authentication signal that includes an authentication identification code of the key-side ECU 37 via the wireless communication circuit 39a and the antenna 39b, and thereafter, the procedure proceeds to step S24 in which the key-side ECU 37 transitions to the first state.

The key-side ECU 37 may be configured to transition to the first state after having transmitted a radio signal including the authentication identification code of the key-side ECU 37 a predetermined number of times, or may be configured to transition to the first state after having received a response signal from the authentication ECU 54 that is configured to transmit a response signal when having received the radio signal from the key-side ECU 37.

Referring back to the processing on the authentication ECU 54 side, in step S4, the authentication ECU 54 determines whether the radio authentication signal has been received from the key-side ECU 37. When it is determined that the signal has not been received, the procedure proceeds to step S12.

In step S12, the authentication ECU 54 determines whether a predetermined standby time has elapsed after a predetermined time (e.g., the time of transmission of the authentication request in step S3). If it is determined that the predetermined standby time has not yet elapsed, the procedure returns to step S4, and processing is performed again. If it is determined that the predetermined standby time has elapsed, the procedure proceeds to step S14 in which the authentication ECU 54 transitions to the first state.

If it is determined in step S4 that the radio authentication signal has been received from the key-side ECU 37, the procedure proceeds to step S5.

In step S5, the authentication ECU 54 determines whether authentication has succeeded. Whether authentication has succeeded may be determined by determining whether the authentication identification code included in the received authentication signal matches the authentication identification code stored in the storage 55 of the authentication ECU 54. If the codes do not match and it is determined that the authentication has failed, the procedure proceeds to step S14 in which the authentication ECU 54 transitions to the first state. If the codes match and it is determined that the authentication has succeeded, the procedure proceeds to step S6.

Note that authentication ends in success when it is determined that the radio authentication signal has been received and that the authentication has succeeded, whereas authentication ends in failure when it is determined that the radio authentication signal has not been received or that the authentication has failed.

The operation part 74 described above may be configured to be capable of receiving insertion of a key that has a predetermined shape and stores an authentication identification code and to be capable of communicating with this key and receiving the authentication identification code stored in the key. In this case, even if the authentication ECU 54 has determined in step S4 that the authentication signal has not been received or determined in step S5 that the authentication has failed, the authentication identification code may be acquired from the key inserted in the operation part 74, and if it is determined on the basis of the authentication identification code that the authentication has succeeded, the authentication may be determined to have succeeded, and the procedure may proceed to step S6.

In step S6, the authentication ECU 54 turns on the solenoid actuator 82 and switches the solenoid 82a to the excited state. This causes the motion restriction part 82b to move in the direction of retraction and thereby enables the user to rotate the operation part 74. Simultaneously with or before or after this, the authentication ECU 54 turns on the light-emitting and notification part 80 and causes the light-emitting and notification part 80 to emit light. The light may stay on or may blink on and off in a predetermined pattern. The length of time the solenoid 82a remains in the excited state and the length of time the light-emitting and notification part 80 emits light are a predetermined length of time. After the predetermined length of time has elapsed, the solenoid 82a transitions to the de-excited state, and the light-emitting and notification part 80 stops emitting light. Thus, the user is able to recognize that the knob 75 is not capable of being turned.

Next, in step S7, the authentication ECU 54 determines, on the basis of the output signal from the rotation detector 76, whether the operation part 74 has been switched from the rotational position (first position) indicating "LOCK" to the rotational position (second position) indicating "ON." If it is determined that the operation part 74 has not been switched, the procedure proceeds to step S13.

In step S13, the authentication ECU 54 determines whether a predetermined standby time has elapsed after a predetermined time (e.g., the time when it is determined in step S5 that the authentication has succeeded, or the time when the solenoid actuator 82 is turned on in step S6). If it is determined that the predetermined standby time has not yet elapsed, the procedure returns to step S7, and processing is performed again. If it is determined that the predetermined standby time has elapsed, the procedure proceeds to step S14 in which the authentication ECU 54 transitions to the first state.

When the user has operated the knob 75, in step S7, the authentication ECU 54 determines that the operation part 74 has been switched from the rotational position (first position) indicating "LOCK" to the rotational position (second position) indicating "ON," and the procedure proceeds to step S8.

In step S8, the authentication ECU 54 causes the engine ECU 60 to transition from the first state to the second state. As described above, the first state of the engine ECU 60 is a state in which less power is consumed than in the second state and in which the engine ECU 60 is capable of transitioning to the second state in which the engine ECU 60 is capable of performing various types of arithmetic processing upon receipt of a signal from the authentication ECU 54. Accordingly, for example, the ignition system and the injector of the engine 24 are capable of being driven and controlled. That is, the engine 24 is capable of being started.

The authentication ECU 54 may be configured such that, after having set the engine ECU 60 to the second state, the authentication ECU 54 transmits an authentication identification code to the engine ECU 60, the engine ECU 60 determines whether authentication has succeeded on the basis of the received authentication identification code and an authentication identification code stored in advance in the engine ECU 60, and if the authentication has been determined to have succeeded, the authentication ECU 54 performs subsequent processing for enabling control of the engine 24 or other units.

Next, in step S9, the authentication ECU 54 determines whether the self starter switch SW1 has been tuned on, and if the self starter switch SW1 has been determined to have been turned on, the procedure proceeds to step S10.

In step S10, the authentication ECU 54 transmits a signal for starting the engine to the engine ECU 60, and the engine ECU 60 starts the engine 24 by rotating and driving the self starter motor and controlling, for example, the ignition system and the injector.

Thereafter, the procedure proceeds to step S11 in which the authentication ECU 54 performs normal operation processing to be performed after the startup of the engine 24.

While the first states are described as a sleep state and the second states are described as a wakeup state by way of example in the above-described embodiment, the first and second states do not necessarily have to be the states described above. For example, power supply to the authentication ECU 54 may not be started in the initial state, and power supply to the authentication ECU 54 or other components may be started when the user has operated and turned on the push detector 78 and thereby a circuit for supplying power to the authentication ECU 54 has been switched to the closed state. In this case, it is preferable that the authentication ECU 54 and the power source are connected by a power supply circuit that includes, for example, a relay and a switching device such as a semiconductor switching device, and a self-hold circuit is provided that allows the authentication ECU 54 to turn on the switching device when power is supplied to the authentication ECU 54. Thus, even if the push detector 78 returns to the off state after having turned on for a short time, power supply to the authentication ECU 54 and other components continues. When the authentication ECU 54 ends the operation (e.g., when the authentication ECU 54 transitions to the first state), the authentication ECU 54 turns off the switching device so as to break the power supply circuit that supplies power to the authentication ECU 54.

Similarly, power supply to the engine ECU 60 may not be stated in the initial state and may be started when a switching device included in a power supply circuit that connects the engine ECU 60 and the power source is tuned on upon receipt of an instruction from the authentication ECU 54.

According to the wireless authentication device 30 configured as described above, the authentication ECU 54 determines whether authentication has succeeded through wireless communication with the mobile terminal 36, and if the authentication has been determined to have succeeded, causes the light-emitting and notification part 80 to perform the light-emitting and notification operation. Accordingly, after having seen the light-emitting and notification operation of the light-emitting and notification part 80 and recognized that the authentication has succeeded, the user is able to rotate the knob 75 from the first position to the second position so as to switch the vehicle to the state in which the engine 24 is capable of being started. Since the light-emitting and notification part 80 is provided in the switch base 71 that is a portion surrounding the operation part 74 including the knob 75, the user will naturally notice the light emission of the light-emitting and notification part 80 when looking at the portion around the knob 75 to operate the knob 75. When operating the knob 75, the user can more reliably grasp whether the authentication has succeeded.

The authentication ECU 54 is capable of causing only the light-emitting and notification part 80 to perform the light-emitting and notification operation without starting other components such as the meter unit 50. This saves the power used in the light-emitting and notification operation, which notifies the user that the authentication has succeeded.

It is also possible to cause the meter unit 50 to display an indication that the authentication has succeeded.

The light-emitting and notification part 80 described above is driven and controlled by the authentication ECU 54 to perform the light-emitting and notification operation. Thus, this light-emitting and notification operation can be performed without starting the display 52 and the engine ECU 60. This contributes to saving power consumption. Reducing power consumption as described above is particularly effective in the state in which the engine 24 is not started.

When having received the authentication start operation via the push detector 78, the authentication ECU 54 determines whether authentication has succeeded through wireless communication with the mobile terminal 36. Until then, the authentication ECU 54 is capable of being on standby in the first state in which less power is consumed. In this respect as well, power consumption is further reduced.

Determining whether authentication has succeeded with the above-described timing is not essential for the authentication ECU 54. The authentication ECU 54 may be configured to continuously monitor the radio signal received from the mobile terminal 36 and determine whether authentication has succeeded when the mobile terminal 36 has moved closer to the motorcycle 10 or when a radio signal has been transmitted from the mobile terminal 36 in response to an operation of a switch or the like of the mobile terminal 36.

Since the push detector 78 serving as the second operating input device receives the displacement of the operation part 74, which is part of the first operating input device, it is possible to continuously and smoothly perform the operations ranging from the authentication start operation by the user to the operation of switching to the state in which the engine 24 is capable of being started.

Since the light-emitting and notification part 80 is provided on the same side (in the present example, left side) of the operation part 74 as the side stand 34 in the motorcycle 10, the user is able to visually recognize the light-emitting and notification operation of the light-emitting and notification part 80 with ease. More specifically, when riding the motorcycle 10, the user typically stands on the same side of the motorcycle 10 as the side stand 34 and operates the side stand 34. Thus, when operating the knob 75, the user typically stands on the same side of the motorcycle 10 as the side stand 34 and operates the knob 75 with the user's hand on the side opposite to the side stand 34 (in the present example, the user's right hand). For this reason, if the light-emitting and notification part 80 is provided on the same side of the knob 75 as the side stand 34, then the user's view will not be obstructed by the user's hand used to operate the knob 75, and accordingly, the user is able to easily check the light-emitting and notification condition of the light-emitting and notification part 80.

Variations

Figure 8:
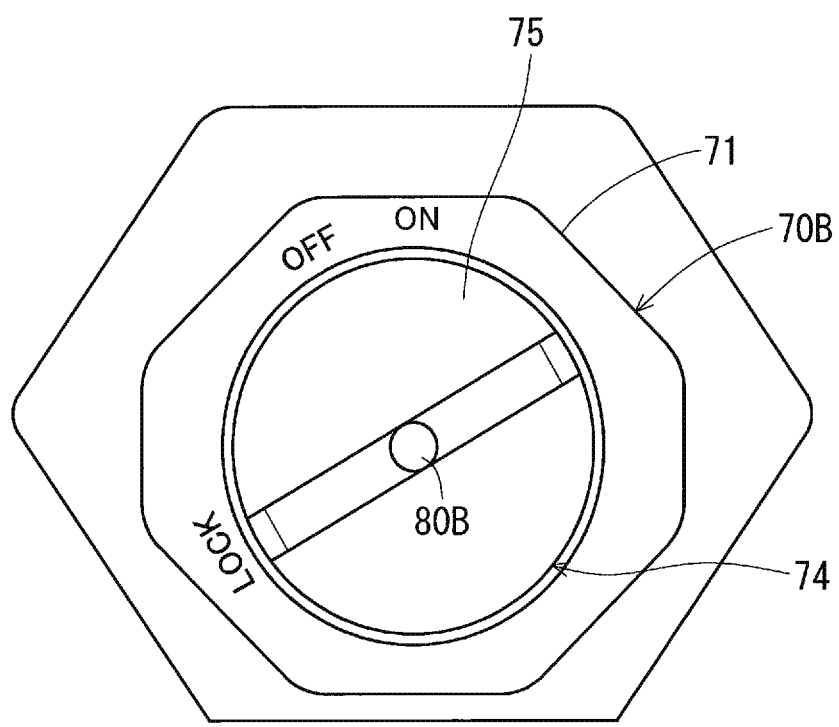
FIG. 8 is a schematic plan view illustrating a start switch unit according to a first variation.

While the above embodiment describes an example in which the light-emitting and notification part 80 is provided in the switch base 71 that surrounds the operation part 74, the light-emitting and notification part 80 may be provided in the knob 75 itself of the operation part 74, as in the case of a start switch unit 70B according to a first variation illustrated in FIG. 8. FIG. 8 illustrates an example in which a light-emitting and notification part 80B is provided in the central portion of the knob 75.

Other alternatives include a light-emitting and notification part that is provided in a portion surrounding the operation part 74 and emits light in a ring shape, and a light-emitting and notification part that causes the entire knob 75 to emit light. Ring-shaped light emitted from the light-emitting and notification part enables the user to more easily recognize that the authentication has succeeded.

When the authentication has been determined to have failed in the above-described embodiment, the light-emitting and notification part 80 may transition to a state different from the above-described state in which the light-emitting and notification part 80 performs the light-emitting and notification operation. In this case, the user is able to more easily recognize that the authentication has failed as a result of the authentication operation.

For example, in the case where the light-emitting and notification part 80 stays lit up for notification when the authentication has been determined to have succeeded, the light-emitting and notification part 80 may intermittently emit light when the authentication has been determined to have failed. Alternatively, in the case where the light-emitting and notification part 80 emits light of a predetermined color for notification when the authentication has been determined to have succeeded, the light-emitting and notification part 80 may emit light of a different color other than the predetermined color when the authentication has been determined to have failed. If the light-emitting and notification part 80 emits light of a different color other than the predetermined color when the authentication has been determined to have failed, the user is able to easily distinguish the case where the authentication has failed as a result of the authentication operation from the case where the authentication has succeeded.

In this case, the light-emitting and notification part 80 may be set to a first error notification state when the authentication has been determined to have failed due to a failure in the mobile terminal.

The light-emitting and notification part 80 may also be set to a second error notification state when the authentication has been determined to have failed due to non-receipt of an authentication radio signal.

The first error notification state and the second error notification state are different from the state in which the light-emitting and notification part 80 emits light when authentication has succeeded, and preferably they are different light-emitting states. Conceivable examples include a case where the light-emitting and notification part 80 blinks on and off in different patterns in the first error notification state and in the second error notification state, or a case where the light-emitting and notification part 80 is configured by a plurality of colors of light-emitting diodes capable of emitting light of different colors and emits light in different colors in the first error notification state and the second error notification state. Thus, the user is able to easily recognize and distinguish between the case where the authentication has failed due to a failure in the mobile terminal and the case where the authentication has failed due to non-receipt of an authentication radio signal.

One example of a flowchart of the above-described processing performed by the authentication ECU 54 according to a second variation will be described with reference to FIG. 9. The flowchart described herein is merely one example and does not intend to describe that the above-described processing performed by the authentication ECU 54 is limited to the processing described below.

Figure 7:
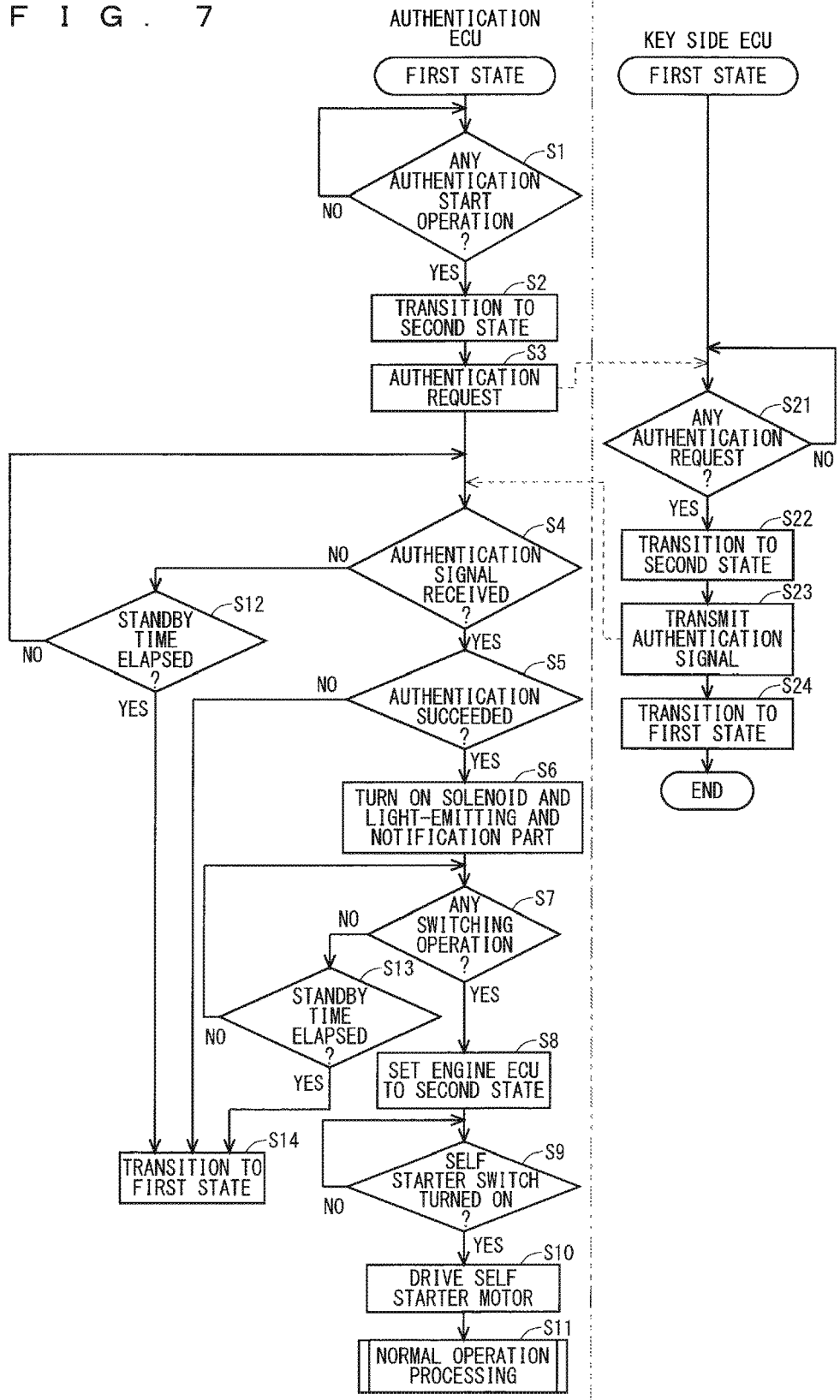
FIG. 7 is a flowchart illustrating authentication processing performed by an authentication ECU and authentication processing performed by a key-side ECU.

More specifically, the flowchart illustrated in FIG. 9 and the flowchart illustrated in FIG. 7 are identical in the processing performed in steps S1 to S10, S13, and S14. The flowchart in FIG. 9 differs primarily in the following two points from the flowchart in FIG. 7.

The first point is processing to be performed after step S4 when it is determined that no authentication signal has been received.

When the authentication ECU 54 has determined in step S4 that no authentication signal has been received, the procedure proceeds to step S51 (same step as step S12), and if it is determined in step S51 that the standby time has elapsed, the procedure proceeds to step S52. That is, the procedure proceeds to step S52 if no authentication radio signal has been received within a predetermined standby time.

In step S52, the authentication ECU 54 sets the light-emitting and notification part 80 to the second error notification state. Thereafter, after the elapse of a predetermined period of time, the procedure proceeds to step S53 in which the authentication ECU 54 transitions to the first state.

In the above-described embodiment, the second error notification state is a state in which the light-emitting and notification part 80 emits light in a different form from that in the case where the light-emitting and notification part 80 performs the light-emitting and notification operation when the authentication has succeeded.

The second point is that step S61 of determining whether the mobile terminal 36 is normal is inserted between step S4 of determining whether an authentication signal has been received and step S5 of determining whether authentication has succeeded, and the procedure proceeds to step S62 if the mobile terminal 36 has been determined not to be normal, i.e., the mobile terminal 36 has been determined to be faulty, in step S61.

That is, the authentication ECU 54 determines whether the mobile terminal 36 is normal in step S61 following step S4. Whether the mobile terminal 36 is normal may be determined from information, such as that received signals are not capable of being decoded into predetermined digital signals including an authentication identification code due to, for example, intermittent reception of radio signals, or that a communication format error occurs in decoded digital signals. If the mobile terminal 36 has been determined to be normal, the procedure proceeds to step S5, and subsequent processing is performed. If the mobile terminal 36 has been determined not to be normal, i.e., determined to be faulty, the procedure proceeds to step S62.

In step S62, the authentication ECU 54 sets the light-emitting and notification part 80 to the first error notification state. Thereafter, after the elapse of a predetermined period of time, the procedure proceeds to step S63 in which the authentication ECU 54 transitions to the first state. The above-described determination as to whether the mobile terminal 36 is normal is part of the processing for determining whether the authentication has succeeded, because the normality of the mobile terminal 36 is one of the conditions for the successful authentication. That is, the authentication ECU 54 determines whether the authentication has succeeded, and sets the light-emitting and notification part 80 to the first error notification state if the authentication has been determined to have failed due to a failure in the mobile terminal 36.

In the above-described embodiment, the first error notification state is a state in which the light-emitting and notification part 80 emits light in a different form from that in the case where the light-emitting and notification part 80 performs the light-emitting and notification operation when the authentication has succeeded.

According to this variation, the authentication ECU 54 determines whether the authentication has succeeded, and if the authentication has been determined to have failed, sets the light-emitting and notification part 80 to a state different from the state in which the light-emitting and notification part 80 performs the light-emitting and notification operation when the authentication has succeeded. Thus, the user is able to recognize that the knob 75 is not capable of being rotated because of failed authentication.

In particular, by recognizing the first error notification state, the user is able to recognize that the authentication has failed due to a failure in the mobile terminal 36 and to easily determine future courses of action, such as replacing the mobile terminal 36 with a spare one or sending the mobile terminal 36 to a repair service.

By recognizing the second error notification state, the user is also able to recognize that the authentication has failed due to non-receipt of an authentication radio signal and to easily grasp the occurrence of undesirable events such as the loss of the mobile terminal 36 or battery exhaustion.

Although it can be generally thought that, if the user is an authorized user, there is little possibility that the authentication will be determined to have failed in step S5, the light-emitting and notification part 80 may be set to a third error notification state when the authentication has been determined to have failed in step S5. The third error notification state is preferably at least different from the light-emitting and notification state of the light-emitting and notification part 80 when the authentication has succeeded.

In the second variation described above, either the processing for notifying the first error notification state or the processing for notifying the second error notification state may be omitted. Alternatively, the first error notification state and the second error notification state may take the same light-emitting and notification form.

While the above embodiment describes an example in which the operation part 74 including the rotatable knob 75 serves as the first operating input device, the first operating input device may be a push switch that receives a push operation from the user, or a slide switch that receives a slide operation from right to left and vice versa and from bottom to top and vice versa in directions orthogonal to the operation screen from the user.

While the above embodiment describes an example in which the push detector 78 that receives the push and displacement of the operation part 74 serves as the second operating input device, the second operating input device is not limited to this example. For example, the rotation detector 76 may be configured to be capable of outputting a state in which the knob 75 is rotated from the rotational position indicating "LOCK" to a rotational position on the side opposite to the rotational position indicating "OFF" and to receive an authentication start operation when the knob 75 is rotated from this opposite rotational position to the rotational position indicating "LOCK." In this case, the rotation detector 76 functions as part of the first operating input device and functions as the displacement operating input device.

As another alternative, the second operating input device may be provided separately from the first operating input device described above, and may be a push switch that receives a push operation from the user, or a slide switch that receives a slide operation from right to left and vice versa and from bottom to top and vice versa in directions orthogonal to the operation screen from the user.

While the above embodiment describes an example in which the engine (Internal combustion engine) 24 serves as a power engine, the power engine may be other engines such as an electric motor. In this case, steps S9 and S10 are omitted from the flowchart in FIG. 7, and the authentication ECU 54 issues a signal indicating that the authentication has succeeded to the engine ECU 60 so as to allow the vehicle to switch to a state in which the power engine is capable of being started.

The configurations described in the embodiments and variations described above may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

As described above, the specification of the present invention includes each aspect of the invention described below.

A first aspect is directed to a wireless authentication device for a saddle-type vehicle for performing authentication through wireless communication with a mobile terminal carried by a user. The wireless authentication device includes a first operating input device that receives an operation of switching to a state in which a power engine is capable of being started, a light-emitting and notification part provided in the first operating input device or in a portion surrounding the first operating input device, and performs a light-emitting and notification operation in which light is emitted to notify a user whether authentication has succeeded, and a controller that determines whether authentication has succeeded through wireless communication with a mobile terminal, and if the authentication has been determined to have succeeded, causes the light-emitting and notification part to perform the light-emitting and notification operation.

With this configuration, if the authentication has been determined to have succeeded, the light-emitting and notification part provided in the first operating input device or in the portion surrounding the first operating input device performs the light-emitting and notification operation. This enables the driver, when operating the first operating input device, to more reliably grasp whether the authentication has succeeded.

A second aspect is directed to the wireless authentication device for a saddle-type vehicle according to the first aspect. The controller serves as an authentication controller, and the light-emitting and notification part is driven and controlled by the authentication controller to perform the light-emitting and notification operation.

With this configuration, the light-emitting and notification part is driven and controlled by the authentication control unit to perform the light-emitting and notification operation. This contributes to saving power consumption.

A third aspect is directed to the wireless authentication device for a saddle-type vehicle according to the first or second aspect. The wireless authentication device further includes a second operating input device capable of receiving an authentication start operation. Upon receiving the authentication start operation via the second operating input device, the controller determines whether authentication has succeeded through wireless communication with a mobile terminal.

With this configuration, when having received the authentication start operation via the switch, the control unit determines whether authentication has succeeded through wireless communication with the mobile terminal. Thus, power consumption is further reduced.

A fourth aspect is directed to the wireless authentication device for a saddle-type vehicle according to the third aspect. The first operating input device is displaced from a first position to a second position to receive an operation of switching to a state in which a power engine is capable of being started, and the second operating input device serves as a displacement operating input device that receives an operation of displacing the first operating input device.

A fifth aspect is directed to the wireless authentication device for a saddle-type vehicle according to any one of the first to fourth aspects. The light-emitting and notification part is provided on the same side of the first operating input device as a side stand in a saddle-type vehicle.

When riding a saddle-type vehicle, the user typically stands on the same side of the saddle-type vehicle as the side stand and operates the side stand. Thus, when operating a main switch, the user typically stands on the same side of the saddle-type vehicle as the side stand and operates the main switch with the user's hand on the side opposite to the side stand. For this reason, if the light-emitting and notification part is provided on the same side of the main switch as the side stand, then the user's view will not be obstructed by the user's hand used to operate the main switch, and accordingly, the user is able to easily check the light-emitting and notification condition of the light-emitting and notification part.

A sixth aspect is directed to the wireless authentication device for a saddle-type vehicle according to any one of the first to fifth aspects. The controller determines whether authentication has succeeded, and if the authentication has been determined to have failed, sets the light-emitting and notification part to a state different from a state in which the light-emitting and notification operation is performed.

This configuration enables the user to recognize that the authentication has been determined to have failed.

A seventh aspect is directed to the wireless authentication device for a saddle-type vehicle according to the sixth aspect. The controller determines whether authentication has succeeded, and if the authentication has been determined to have failed due to a failure in the mobile terminal, sets the light-emitting and notification part to a first error notification state.

This configuration enables the user to recognize that the authentication has been determined to have failed due to a failure in the mobile terminal.

An eighth aspect is directed to the wireless authentication device for a saddle-type vehicle according to the sixth or seventh aspect. The controller determines whether authentication has succeeded, and if the authentication has been determined to have failed due to non-receipt of an authentication radio signal, sets the light-emitting and notification part to a second error notification state.

What is claimed is:

1. A wireless authentication device for a saddle-type vehicle for performing authentication through wireless communication with a mobile terminal carried by a user, the wireless authentication device comprising:
    a first operating input device that receives an operation of switching to a state in which a power engine is capable of being started;
    a light-emitting and notification part provided in said first operating input device or in a portion surrounding said first operating input device, wherein the light-emitting and notification part performs a light-emitting and notification operation in which light is emitted to notify a user that authentication is successful;
    an authentication controller that determines whether authentication is successful through wireless communication with the mobile terminal, and, if the authentication has been determined to be successful, causes said light-emitting and notification part to perform the light-emitting and notification operation, wherein said light-emitting and notification part is driven and controlled by said authentication controller to perform the light-emitting and notification operation; and
    an engine control unit that is different from the authentication controller.

2. The wireless authentication device according to claim 1, further comprising a second operating input device capable of receiving an authentication start operation;
    wherein, upon receiving said authentication start operation via said second operating input device, said authentication controller determines whether authentication is successful through wireless communication with the mobile terminal.

3. The wireless authentication device according to claim 2, wherein said first operating input device is displaced from a first position to a second position to receive the operation of switching to the state in which a power engine is capable of being started; and
    wherein said second operating input device serves as a displacement operating input device that receives an operation of displacing said first operating input device.

4. The wireless authentication device according to claim 1, wherein said light-emitting and notification part is provided on the same side of said first operating input device as a side stand of the saddle-type vehicle in a horizontal direction of the saddle-type vehicle.

5. The wireless authentication device for a saddle-type vehicle according to claim 1, wherein said authentication controller determines whether authentication is successful, and if the authentication is determined to have failed, sets said light-emitting and notification part to a state that is different from a state in which said light-emitting and notification operation is performed.

6. The wireless authentication device according to claim 5, wherein said authentication controller determines whether authentication is successful, and if the authentication is determined to have failed due to a failure in said mobile terminal, sets said light-emitting and notification part to a first error notification state.

7. The wireless authentication device according to claim 5, wherein said authentication controller determines whether authentication is successful, and if the authentication is determined to have failed due to non-receipt of an authentication radio signal, sets said light-emitting and notification part to a second error notification state.

8. The wireless authentication device according to claim 6, wherein said authentication controller determines whether authentication is successful, and if the authentication has been determined to have failed due to non-receipt of an authentication radio signal, sets said light-emitting and notification part to a second error notification state.

9. The wireless authentication device according to claim 1, wherein the first operating device includes a shaft part and a knob provided at one end of the shaft part, and
wherein the light emitting and notification part is provided in a switch base, which is a portion surrounding the knob.

10. The wireless authentication device according to claim 9, wherein the light-emitting and notification part is provided on a front side of a seat of the saddle-type vehicle, which is a portion surrounding the knob and in front of a center of the knob.

11. The wireless authentication device according to claim 1, wherein the light-emitting and notification part is provided on a side of the saddle-type vehicle opposing a self-starter switch in a width direction of the saddle-type vehicle.

* * * * *